United States Patent
Lee

(10) Patent No.: US 9,442,312 B2
(45) Date of Patent: Sep. 13, 2016

(54) CLIP EYEGLASSES USING GOGGLES LENS

(71) Applicant: Dae Woo Lee, Daegu (KR)

(72) Inventor: Dae Woo Lee, Daegu (KR)

( * ) Notice: Subject to any disclaimer, the term of this patent is extended or adjusted under 35 U.S.C. 154(b) by 0 days.

(21) Appl. No.: 14/443,876

(22) PCT Filed: Nov. 4, 2013

(86) PCT No.: PCT/KR2013/009911
§ 371 (c)(1),
(2) Date: May 19, 2015

(87) PCT Pub. No.: WO2014/112708
PCT Pub. Date: Jul. 24, 2014

(65) Prior Publication Data
US 2016/0026010 A1    Jan. 28, 2016

(30) Foreign Application Priority Data
Jan. 18, 2013  (KR) .................... 20-2013-0000475 U

(51) Int. Cl.
*G02C 9/04*    (2006.01)
*G02C 7/10*    (2006.01)

(52) U.S. Cl.
CPC . *G02C 9/04* (2013.01); *G02C 7/10* (2013.01); *G02C 2200/06* (2013.01)

(58) Field of Classification Search
CPC .................................. G02C 9/04; G02C 7/16
USPC ........................ 351/47; 2/13, 429, 441, 443
See application file for complete search history.

(56) References Cited

U.S. PATENT DOCUMENTS

| 5,614,963 A * | 3/1997 | Parker ............... G02C 7/10 2/13 |
| 6,557,995 B1* | 5/2003 | Edwards ............ G02C 7/16 351/44 |
| 6,776,481 B2* | 8/2004 | Ng .................... G02C 9/04 351/47 |
| 2006/0250570 A1* | 11/2006 | Friedman ........... G02C 5/04 351/47 |
| 2009/0231539 A1* | 9/2009 | Xie .................... G02C 9/04 351/48 |

FOREIGN PATENT DOCUMENTS

| JP | 2006-504142 | 2/2006 |
| KR | 2019990041584 | 6/2000 |
| KR | 2003502390000 | 5/2004 |

* cited by examiner

*Primary Examiner* — Darryl J Collins
(74) *Attorney, Agent, or Firm* — IPLA P.A.; James E. Bame

(57) ABSTRACT

Clip eyeglasses detachably mounted on prescription glasses, including: a goggles lens whose left and right sides are formed unitarily with each other, without having any frame, the goggles lens being made of synthetic resin in such a manner as to have higher curvature and elastic force than the prescription glasses; and fixtures mounted at both sides of the goggles lens in such a manner as to be supported against the prescription glasses, wherein the goggles lens is stretched and attached to the prescription glasses by means of the elastic force thereof, and the goggles lens is applied to the prescription glasses having different shapes and sizes.

3 Claims, 5 Drawing Sheets

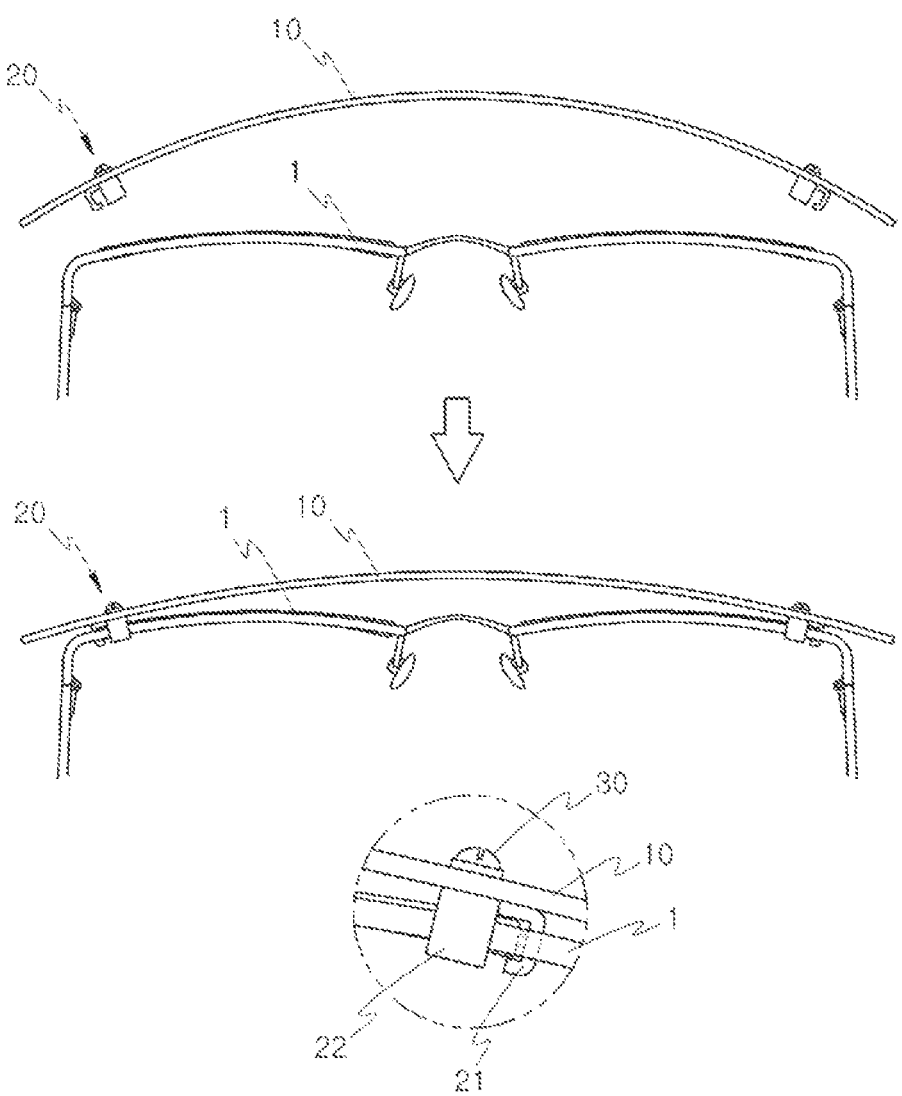

CLIP EYEGLASSES USING GOGGLES LENS

BACKGROUND

The present invention relates to clip eyeglasses using a goggles lens, and more particularly, to clip eyeglasses using a goggles lens that is configured to have the goggles lens whose left and right sides are formed unitarily with each other to allow the clip eyeglasses to be attached to prescription glasses through the elastic force generated therefrom, without having any magnet or spring used for conventional clip eyeglasses, so that the clip eyeglasses can be simple in configuration, thus making the manufacturing process easy and improving the outer appearance thereof, and that is configured attachable freely to prescription glasses having a variety of sizes and shapes.

Generally, the people having poor sight who wear prescription glasses should have separate prescription sunglasses so as to protect their eyes from strong sunlight while they are driving or while they are being at the outside, thus making them feel uncomfortable in using the prescription sunglasses. So as to remove the above-mentioned problems, accordingly, clip eyeglasses, which is detachably attached to general glasses, has been proposed and used.

On the other hand, conventional clip eyeglasses has fastening means like a magnet or spring so as to prevent the attached state between the clip eyeglasses and general prescription glasses from being arbitrarily released. Referring to FIGS. 1 and 2, schematic configurations of the conventional clip eyeglasses will be described below.

As shown in FIG. 1, first, the clip eyeglasses using magnets is configured wherein a pair of magnets 115 is mounted at both sides of a frame of prescription glasses 110 and a pair of magnets 125 is at both sides of a frame of clip eyeglasses 120, thus allowing the clip eyeglasses 120 to be detachably attached to the prescription glasses 110. In this case, the clip eyeglasses 120 using the magnets can be simply detachably attached to the prescription glasses 110, but the clip eyeglasses 120 does not have any compatibility, so that it cannot be applied to general glasses having various sizes and shapes. Further, the clip eyeglasses 120 has to have the same frame as the prescription glasses 110 having the pair of magnets 115, thus having serious limitations in sizes and shapes.

As shown in FIG. 2, next, the clip eyeglasses using a spring is configured wherein a spring member 225 is adapted to connect the frames formed on the left and right lenses of the clip eyeglasses 220 with each other, so that the clip eyeglasses 220 is attached to prescription glasses 210 by means of the contractile force of the spring member 225, without being escaped from the prescription glasses 210. In this case, the clip eyeglasses 220 using the spring has given compatibility, but so as to form the spring member 225 on the left and right lenses of the clip eyeglasses 220, the clip eyeglasses 220 has to have the frames, so that it is hard to be applied to other prescription glasses except the prescription glasses 210 having the same shapes as the clip eyeglasses 220. Further, the spring member 225 or the spring is exposed to the outside, so that the outer appearance of the clip eyeglasses 220 becomes not good, the manufacturing process becomes not easy, and the operating part like the spring may fail to work.

SUMMARY OF THE INVENTION

Accordingly, the present invention has been made in view of the above-mentioned problems occurring in the prior art, and it is an object of the present invention to provide clip eyeglasses using goggles lens that is configured to have the goggles lens whose left and right sides are formed unitarily with each other to allow the clip eyeglasses to be attached to prescription glasses through the elastic force generated therefrom, without having any separate means like a magnet or spring, so that the clip eyeglasses can be simple in configuration, thus making the manufacturing process and the usage easy and having no failure in operation, and that is configured freely formed in shapes, thus satisfying a variety of preference of consumers.

To accomplish the above-mentioned object, according to the present invention, there is provided clip eyeglasses detachably mounted on prescription glasses, including: a goggles lens whose left and right sides are formed unitarily with each other, without having any frame, the goggles lens being made of synthetic resin in such a manner as to have higher curvature and elastic force than the prescription glasses; and fixtures mounted at both sides of the goggles lens in such a manner as to be supported against the prescription glasses, wherein the goggles lens is stretched and attached to the prescription glasses by means of the elastic force thereof, and the goggles lens is applied to the prescription glasses having different shapes and sizes.

According to the present invention, preferably, the goggle lens has through-holes formed on both sides thereof, while the fixtures having fastening holes formed thereon correspondingly to the through-holes in such a manner as to be attached to the goggles lens through fastening screws and nuts, and the through-holes or the fastening holes have a rectangular shape in such a manner as to allow the position of the fixtures to be adjusted.

According to the present invention, preferably, each fixture includes a locking piece formed protrudingly from one side surface thereof in such a manner as to be supported against one side surface of the prescription glasses and a supporting piece formed protrudingly from the top side thereof in such a manner as to be seated onto the top side of the prescription glasses.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 9 is a top view showing the operating state of the clip eyeglasses according to the present invention.

DETAILED DESCRIPTION OF THE PREFERRED EMBODIMENTS

Hereinafter, an explanation on clip eyeglasses using a goggles lens according to the present invention will be in detail given with reference to the attached drawings.

Figure 1:
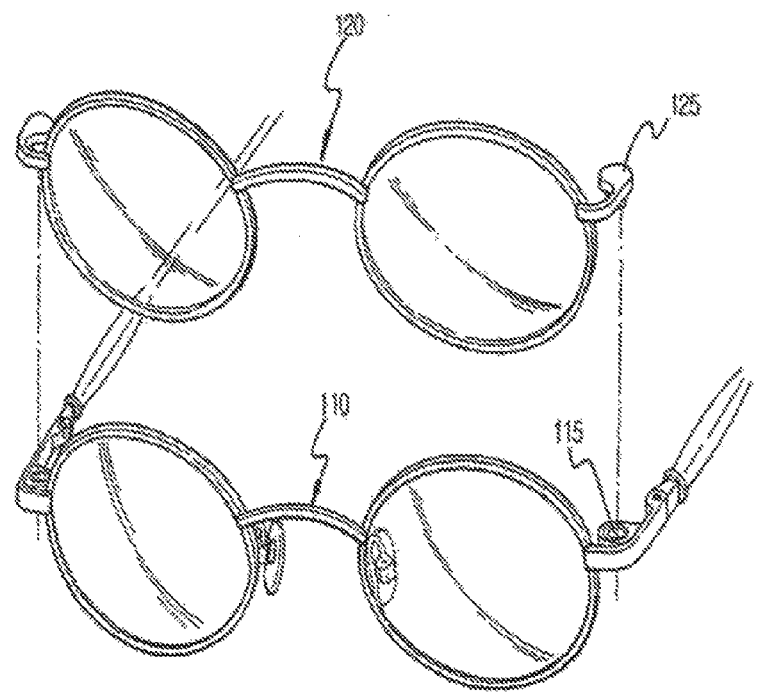
FIG. 1 is a perspective view showing conventional clip eyeglasses using magnets.
Figure 2:
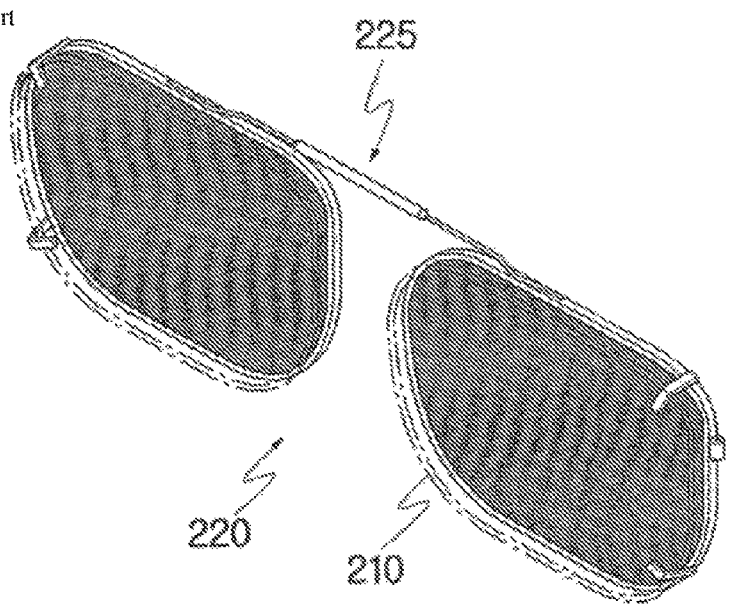
FIG. 2 is a perspective view showing another conventional clip eyeglasses using a spring.
Figure 2:
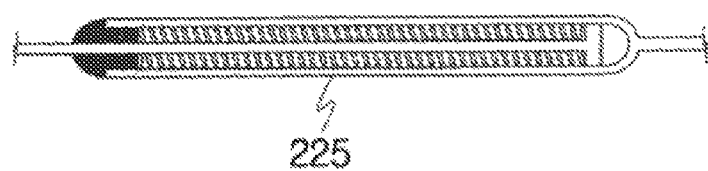
Figure 3:
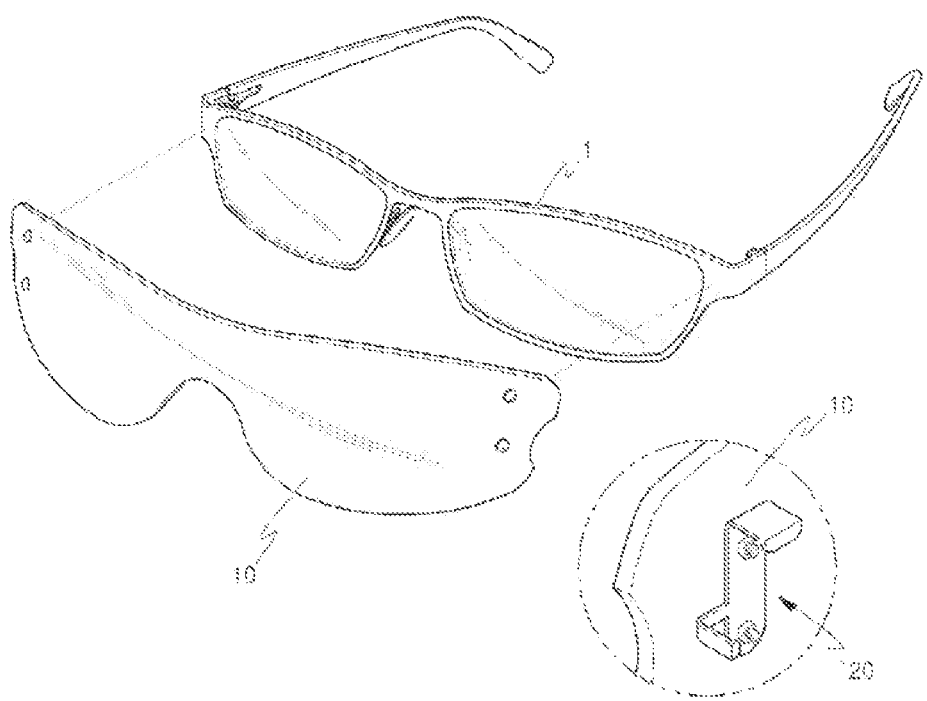
FIG. 3 is a perspective view showing clip eyeglasses using goggles lens according to the present invention.
Figure 4:
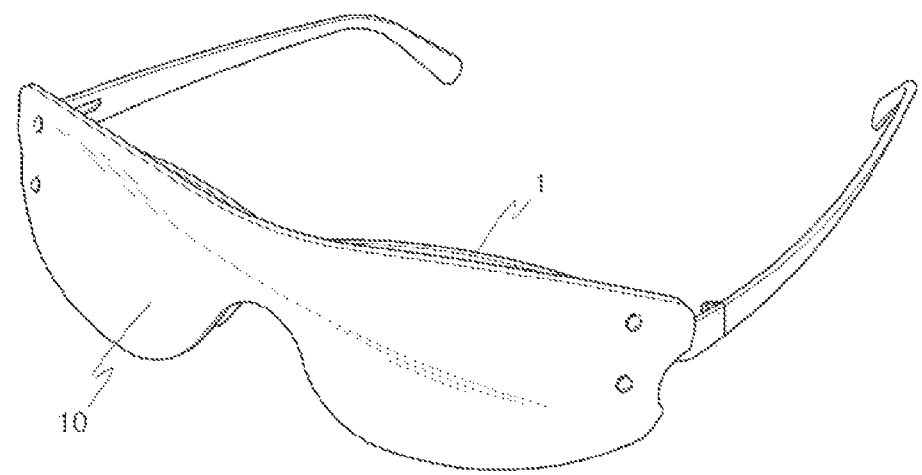
FIG. 4 is a perspective view showing the usage state of the clip eyeglasses according to the present invention.
Figure 5:
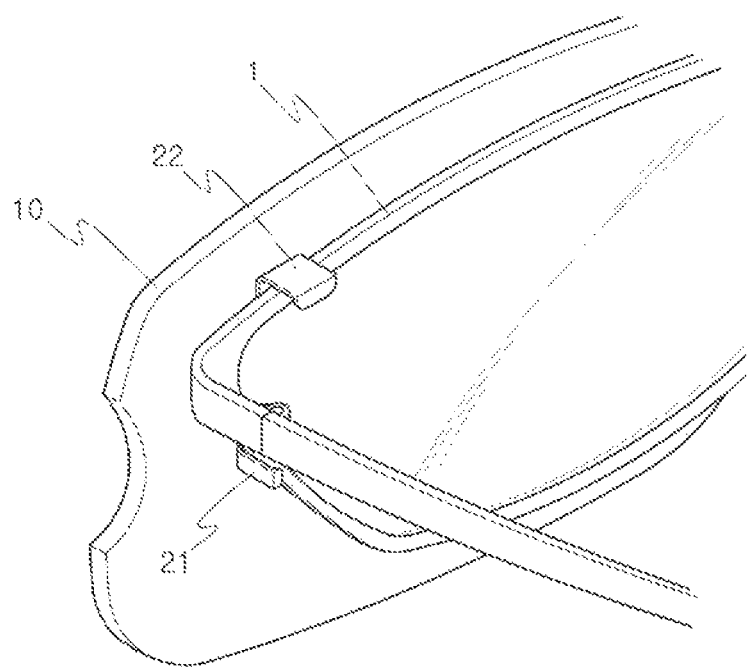
FIG. 5 is a perspective view showing the usage state of a fixture of the clip eyeglasses according to the present invention.

According to the present invention, clip eyeglasses is detachably mounted on prescription glasses 1, and as shown in FIG. 3, the lenses of the clip eyeglasses are formed of a goggles lens 10 whose left and right sides are formed unitarily with each other. Like typical goggles, the goggles lens 10 is made of synthetic resin in such a manner as to have higher curvature and elastic force than the prescription glasses 1.

Further, fixtures 20 are mounted at both sides of the goggles lens 10 and each includes a locking piece 21 formed protrudingly from one side surface thereof in such a manner as to be supported against one side surface of the prescription glasses 1 and a supporting piece 22 formed protrudingly from the top side thereof in such a manner as to be seated onto the top side of the prescription glasses 1, so that the clip eyeglasses can be attached to the prescription glasses 1 by means of the elastic force of the goggles lens 10 itself.

That is, as shown in FIG. 9, the curvature of the goggles lens 10 is higher than that of the prescription glasses 1 and the elastic force of the goggles lens 10 is better than that of the prescription glasses 1. So as to attach the clip eyeglasses to the prescription glasses 1, accordingly, the goggles lens 10 is stretched to allow the locking pieces 21 of the fixtures 20 to be supported against both sides of the prescription glasses 1, so that the clip eyeglasses can be simply attached to the prescription glasses 1. In this case, the strong elastic force of the goggles lens 10 is sent to the locking pieces 21 to permit the attachment to the prescription glasses 1 to become more rigid, and at this time, the supporting pieces 22 serve to secure the attaching positions of the goggles lens 10.

Figure 6:
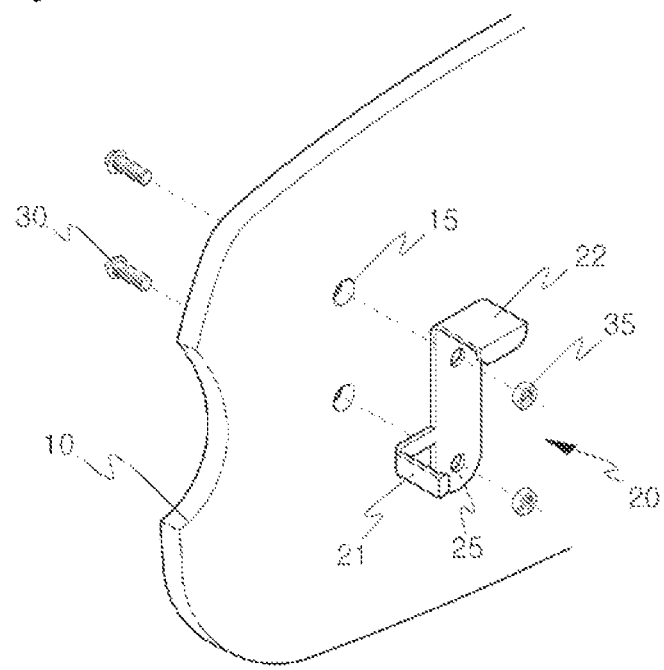
FIG. 6 is an exploded perspective view showing an example of the fixture of the clip eyeglasses according to the present invention.
Figure 7:
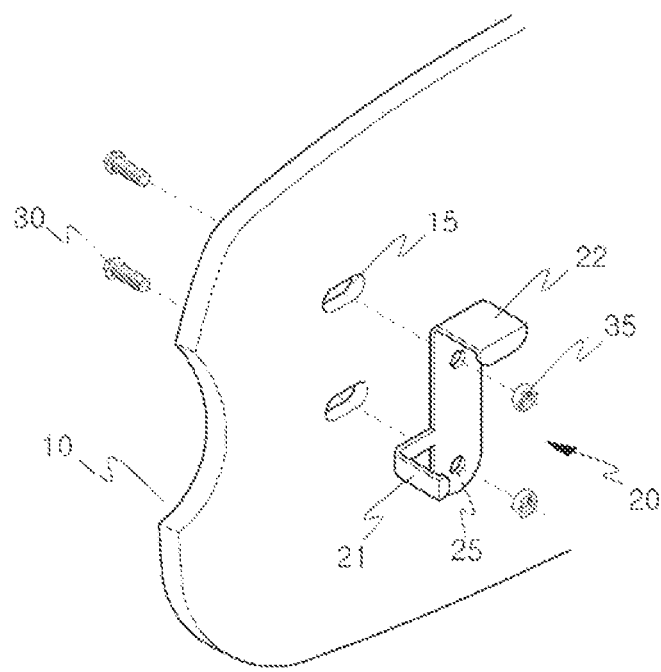
FIGS. 7 and 8 are exploded perspective views showing other examples of the fixture of the clip eyeglasses according to the present invention.
Figure 8:
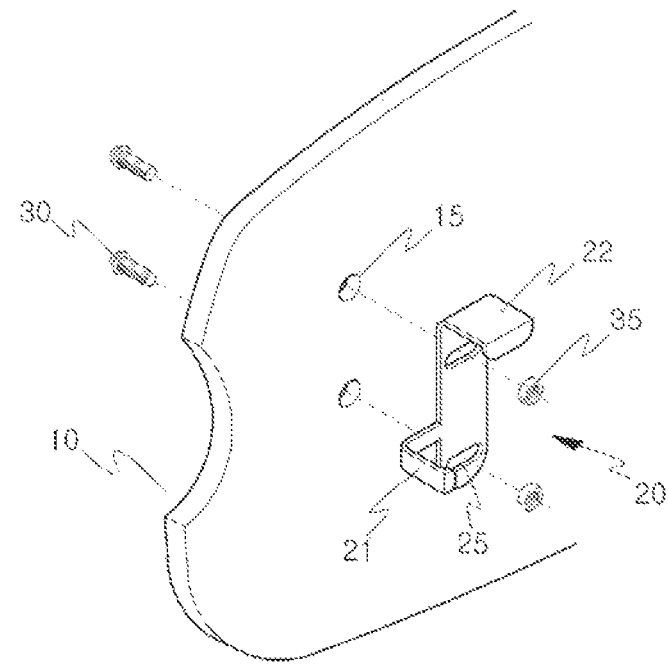

On the other hand, the fixtures 20 may be made of synthetic resin in such a manner as to be bonded to the goggles lens 10, but as shown in the drawings, the fixtures 20 made of metal or synthetic resin are desirably fastened to the goggles lens 10. For example, as shown in FIG. 6, through-holes 15 are formed on the goggles lens 10 and fastening holes 25 are formed on each fixture 20 correspondingly to the through-holes 15, thus attaching the fixture 20 to the goggles lens 10 through fastening screws 30 and nuts 35. Otherwise, as shown in FIG. 7, rectangular through-holes 15 may be formed on the goggles lens 10, and as shown in FIG. 8, rectangular fastening holes 25 may be formed on the fixture 20, thus allowing the position of the fixture 20 to be adjusted.

Further, even if not shown in the drawings, only one through-hole 15 may be formed on the goggles lens 10, and only one fastening holes 25 may be formed on the fixture 20. Furthermore, the fixture 20 may have various shapes and sizes, thus optimizing the compatibility thereof. Particularly, if the fixture 20 is made of metal, the locking piece 21 and the supporting piece 22 of the fixture 20, which are brought into contact with the prescription glasses 1, are desirably coated with flexible resin.

Hereinafter, an explanation on the operation of the clip eyeglasses using the goggles lens 10 according to the present invention will be given.

If the clip eyeglasses is attached to or separated from the prescription glasses 1, it can be detachably attached to the prescription glasses 1 just with the stretching operation of the goggles lens 10, and further, the clip eyeglasses can be firmly attached to the prescription glasses 1 by means of the elastic force of the goggles lens 10 itself. As a result, the clip eyeglasses using the goggles lens 10 according to the present invention does not need any separate means like magnets or spring and is simple in configuration, thus making the manufacturing process easy and having no failure in operation.

As described above, the clip eyeglasses according to the present invention can be attached to the prescription glasses by means of the elastic force of the goggles lens whose left and right sides are unitarily formed with each other, without having any separate means like magnets or spring, and further, the clip eyeglasses can be simple in configuration, thus making the manufacturing process easy and having no failure in operation. Moreover, the clip eyeglasses can be attached to the prescription glasses in more stable manner through the strong elastic force of the goggles lens, and since a part like a spring is not exposed to the outside, the outer appearance of the clip eyeglasses can be improved. Additionally, since the clip eyeglasses does not have any frame, it can be applied to various kinds of prescription glasses having different shapes and sizes, and further, the outer appearance of the clip eyeglasses can be freely formed in accordance with a consumer's preference.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. Clip eyeglasses detachably mounted on prescription glasses (1), comprising:
   a goggles lens (10) whose left and right sides are formed unitarily with each other, without having any frame, the goggles lens (10) being made of synthetic resin in such a manner as to have higher curvature and elastic force than the prescription glasses (1); and
   fixtures (20) mounted at both sides of the goggles lens (10) in such a manner as to be supported against the prescription glasses (1),
   wherein the goggles lens (10) is stretched and attached to the prescription glasses (1) by means of the elastic force thereof, and the goggles lens (10) is applied to the prescription glasses (1) having different shapes and sizes.

2. The clip eyeglasses according to claim 1, wherein the goggle lens (10) has through-holes (15) formed on both sides thereof, while the fixtures (20) having fastening holes (25) formed thereon correspondingly to the through-holes (15) in such a manner as to be attached to the goggles lens 10 through fastening screws (30) and nuts (35), and the through-holes (15) or the fastening holes (25) have a rectangular shape in such a manner as to allow the position of the fixtures (20) to be adjusted.

3. The clip eyeglasses according to claim 1, wherein each fixture (20) comprises a locking piece (21) formed protrudingly from one side surface thereof in such a manner as to be supported against one side surface of the prescription glasses (1) and a supporting piece (22) formed protrudingly from the top side thereof in such a manner as to be seated onto the top side of the prescription glasses (1).

* * * * *